2,909,796
PIPELINE SCRAPERS

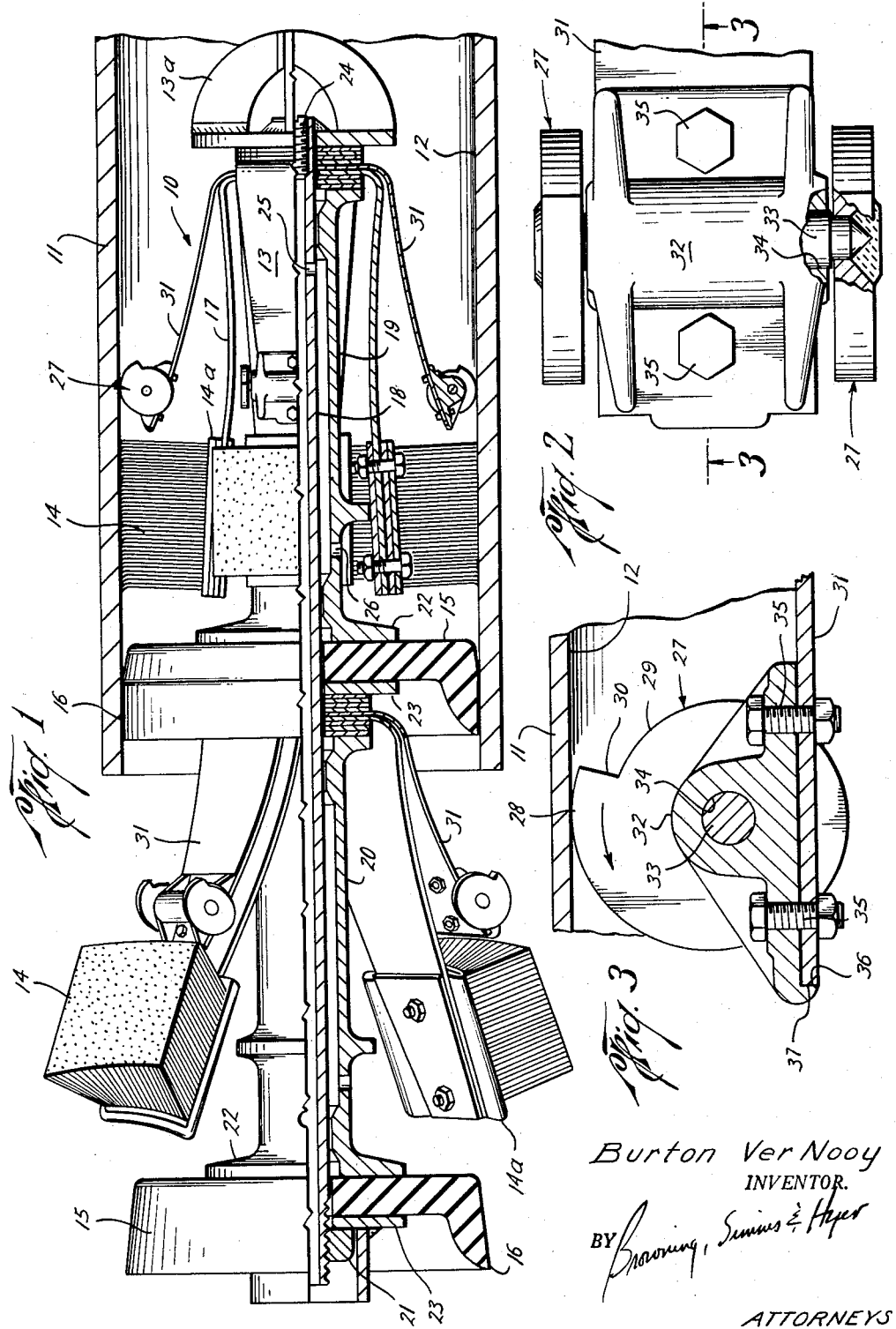

Burton Ver Nooy, Tulsa, Okla., assignor to T. D. Williamson, Inc., Tulsa, Okla.

Application February 27, 1957, Serial No. 642,810

7 Claims. (Cl. 15—104.07)

This invention relates to improvements in apparatus for use in removing rust, scale and the like from the inside wall of a pipeline.

Pipeline scrapers generally comprise a body movable longitudinally through the pipeline and carrying a plurality of scraping elements thereabout for resilient engagement with the pipeline wall. These elements frequently comprise brushes carried by and urged outwardly from the scraper body by leaf springs. When the scrapers encounter large valve openings in the line, it is not uncommon for the brushes or other outwardly urged scraping elements to fly into the openings. As a result, the brushes may be damaged and caught in the opening.

An object of this invention is to provide apparatus of this type having novel means for removing rust, scale and other foreign substance from the pipeline wall by jarring thereagainst.

Another object is to provide a pipeline scraper having outwardly urged scraping elements which are protected against damage and catching in a valve opening or the like in the line.

It is desirable, in the scraping of foreign matter from the inside walls of pipelines, to trace the movement of the scraper through the line. For example, the scraper may become stuck or slow down due to an obstruction in the line. In view of the great distances which it may travel and the high speeds at which it is propelled, the position of the conventional scraper cannot be traced by the mere noise inherent in its movement through the line. Although the industry has long been concerned with the development of scrapers having audible location indicators or "noisemakers," none have proven satisfactory and, as a practical matter, resort has been made to expensive visual indicators.

Still another object of this invention is to provide a scraper which will make sufficient noise as it moves through a pipeline that it may be heard from a considerable distance, and which is of extremely simplified and inexpensive construction.

A further object is to provide a pipeline scraper having noisemaking parts arranged thereon in a manner to protect the scraping elements.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a longitudinal sectional view of a pipeline scraper constructed in accordance with the present invention, and with its forward end disposed within a pipeline for scraping the inside wall thereof;

Fig. 2 is an enlarged detailed top plan view of the noisemaking parts of the scraper and the bearing assembly therefor; and Fig. 3 is a sectional view, taken along broken line 3—3 of Fig. 2, of such parts and the bearing assembly therefor in operative position with respect to the inside wall of the pipeline.

In accordance with one novel aspect of the present invention, the apparatus for removing rust, scale and other foreign substance from the inside wall of a pipeline comprises a body movable longitudinally through the line and a plurality of rollers carried by and resiliently urged away from the body for rotatably engaging the wall of the pipeline. Successive wall engaging surfaces of the rollers are radially offset from one another so that the surfaces of lesser radial extent are caused to intermittently jar against the wall of the pipeline during rotation of the rollers and thereby knock rust, scale and the like loose from said wall. More particularly, the rollers are arranged to center the body within the line and provide substantially full coverage about the pipeline wall.

In accordance with another novel aspect of the present invention, wherein conventional scraping elements are carried by and resiliently urged away from a scraper body, rollers of the character above-described are provided to audibly indicate the position of the scraper within the line. For this purpose, each roller preferably comprises a cam part having a spiraled periphery so arranged as to jar against the pipeline wall as the portion thereof of greatest radial extent rotates toward disengagement from the wall. More particularly, each roller may comprise two or more cam parts having their spiraled peripheries synchronized to jar against the pipeline wall substantially simultaneously and thus concentrate the noise.

In accordance with still another object of the present invention, a pipeline scraper having scraping elements arranged thereabout is provided with rotatable rollers each being disposed forwardly and in substantial longitudinal alignment with a brush. Both the brushes and the rollers are carried by leaf springs with the spring mounting each brush being arranged relative to the leaf spring mounting the roller forwardly thereof so as to depress said brush in response to depression of said roller. Thus, as the scraper encounters a valve opening in the line, the rollers will engage with and rotate past the front edge thereof and thus be depressed. The resultant depression of the brushes prevents them from being caught by the front edge of the opening as they move therepast.

In accordance with a still further novel aspect of the invention, the protecting rollers comprise cam parts of the type previously described for jarring against the pipeline wall, and are arranged about the scraper body to provide substantially full pipe coverage in order to supplement the action of the scraping elements.

In accordance with more particular aspects of the invention, the roller or cam part is mounted for rotation about an axis transverse to the pipeline by means of a bearing which is secured to a leaf spring connected to the body and extending rearwardly therefrom to resiliently force the roller periphery into engagement with the pipeline wall. The bearing is detachably secured to the spring in such a manner as to prevent the rollers from being assembled with the remainder of the scraper body in other than the position contemplated.

Turning now to a detailed description of the drawings, there is shown in Fig. 1 an illustrative embodiment of apparatus or pipeline scraper constructed in accordance with the present invention and designated in its entirety by reference character 10. The forward or rightmost end of the scraper is shown disposed within a pipeline 11 for scraping foreign matter from the inside wall 12 thereof, while the rear or leftmost end of the scraper is shown removed from the pipeline. As is conventional in the art, the scraper 10 includes a body 13 movable longitudinally within the pipeline—in this instance, from left to right—and a plurality of scraping elements 14 carried about the body for engagement with the wall 12 of the pipeline. As can be seen from Fig. 1, there may be two longitudinally spaced apart sets of such elements, the elements of one set being circumferentially staggered with respect to those of the other in order to provide full coverage about the wall of the pipeline.

The forward end of the scraper body 13 may be provided with a nose piece 13a which permits a line to be hitched thereto for pulling the scraper forwardly through the pipeline. Preferably, however, the body 13 is provided with one or more pistons 15 thereabout which sealably engage the wall 12 of the pipe line 11 when disposed therein so that the scraper may be propelled through the line by means of fluid pressure behind the scraper. These pistons are located behind the front and rear sets of scraping elements 14 so as to sweep the material scraped from the walls forwardly of the scraper for removal from the line. As can be seen from Fig. 1, and as well known in the art, the pistons 15 comprise rubber cups having rearwardly extending and outwardly flaring sealing lips 16.

The scraper elements 14 are carried from the body for resilient engagement with the pipeline wall by means of leaf springs 17 connected to the body and extending rearwardly therefrom. Each element is shown to comprise a brush made up of a plurality of radially extending wire bristles secured to the outer end of the leaf spring by means of a mounting plate 14a, although it is obvious that other types of elements, such as plows, may be used. As can be seen from the leftmost end of Fig. 1, the plate and ends of the bristles are curved to conform to the pipe-line wall. With the scraper removed from the line, the brushes are urged by the leaf springs 17 to a position in which their scraping surfaces are projected outwardly of the pipeline circumference. Thus, when the scraper is disposed within the pipeline, the brushes are compressed inwardly against the force of the springs 17 so as to tightly engage the inside wall 12 of the pipeline. It will be understood that this spring mounting of the brushes 14 also permits them to be moved further inwardly of the body when obstructions are met within the line so that, under normal conditions, the scraper will not be stuck within the line or the brushes damaged due to passage over such obstructions.

In accordance with further conventional features of pipeline scraper construction, the body 13 may comprise an axially extending tubular member 18 to the front end of which the nose piece 13a is secured by welding or other suitable means. The sealing cups 15 are received about the body and fixedly spaced apart longitudinally thereof by means of sleeves 19 and 20 which surround the member 18 intermediate the nose piece 13a and a nut 21 threadedly secured to the rear end of the part 18. As can be seen from Fig. 1, the leaf springs 17 are bent inwardly at their inner ends for securement between the nose piece 13a and the forward end of sleeve 19, in the case of the forward set of scraping elements 14, and between the forward sealing cup 15 and the forward end of sleeve 20, in the case of the rear set of scraping elements. The laterally extending faces of the sealing cups 15 may be braced on opposite sides by means of flanges 22 on the spacing sleeves 19 and 20 and discs 23 received about the tubular member 18.

The scraper is provided with a small fluid by-pass to permit the pressure fluid rearwardly thereof to agitate the loosened debris swept forwardly thereof. For this purpose, the forward end of the tubular member 18 is closed by a plug 24 and communicating ports 25 and 26 are provided through said member and the forward spacer sleeve 19, respectively. Thus, a small amount of the pressure fluid behind the scraper escapes through the tubular member 18, the ports 25 and 26, and into the pipeline in front of the forward sealing cup.

It will be understood that the scraper may be of another well known construction, and that the foregoing is merely illustrative of one suitable construction with which the novel features of the present invention are useable. Thus, for example, in some instances, the scraping elements may be urged outwardly by other than leaf springs. In other instances, the leaf springs may be eliminated in entirety.

The aforementioned novel means for accomplishing the various objects of the present invention comprises rollers 27 carried by and resiliently urged away from the body 13 of the scraper for rotatably engaging the wall 12 of the pipeline as the scraper is so moved. The rollers are provided with successive wall engaging surfaces 28 and 29 which are radially offset from one another so that, as a roller rotates in a counterclockwise direction (see the arrow of Fig. 3), the surface 29 of lesser radial extent is caused to intermittently jar against the wall 12 when the surface 28 of greater radial extent moves toward disengagement from the wall. More particularly, the rollers are cams having spiraled peripheries so arranged that the offset 30 between the surfaces 28 and 29 faces in a general direction opposite to the rotation of the rollers.

Similarly to the scraping elements 14, each of the rollers is carried by and resiliently urged away from the body of the scraper by means of leaf springs 31 connected to the body and extending rearwardly therefrom. Detachably secured to the outer ends of the leaf springs 31 are bearings 32 which mount the rollers for rotation about axes transverse to the pipeline. More particularly, and as shown in Figs. 2 and 3, a pair of the rollers 27 may be fixed to a common shaft 33 and the shaft journaled within a transverse opening 34 through the bearing therefor. As can be seen from the drawings, the offset surfaces 30 of each pair of rollers are transversely aligned with one another so that their surfaces 29 will jar against the pipeline wall substantially simultaneously and thus concentrate the noise made thereby.

As shown in Figs. 2 and 3, the bearings 32 are detachably secured to the leaf springs 31 by means of bolts 35. The bolt holes in the bearings and springs are aligned with one another to permit such securement by a shoulder 36 on the underside of the bearing which abuts with the outer end edge 37 of the spring to be secured thereto. This shoulder also prevents the bearing 32 from being improperly secured to the spring. More specifically, it prevents the bearing from being secured in a position which would mount the rollers for rotation in a direction opposite to that shown.

Each leaf spring 31 is connected to the body of the scraper so as to dispose the rollers 27 mounted thereon forwardly of and in substantial longitudinal alignment with a scraper element 14. Thus, if an obstruction is encountered in the line, the impact thereof will be absorbed by the rollers such that the wire bristles of the brushes are protected against serious damage.

Thus, as can be seen from Fig. 1, there are two longitudinally spaced apart sets of leaf springs 31 for the rollers 27. Similarly to the leaf spring 17, the inner ends of the springs 31 are bent inwardly for securement between the nose piece 13a and forward end of spacer sleeve 19, in the case of the forward set of springs, and the forward sealing cup 15 and the forward end of spacer sleeve 20, in the case of the rear set of springs.

It will thus be seen that should the scraper encounter a valve opening in the line, each roller will first be forced outwardly into the opening and then be returned to normal position as it rotates over the front edge of the opening. In returning to normal position, the roller will force its spring 31 inwardly and thus retract the brush 14 disposed rearwardly thereof as the spring 17 for such brush is also forced inwardly. As a result, the brush is prevented from catching on the front edge of the opening.

It is contemplated that in addition to supplementing the action of the brushes 14, the rollers may be used independently thereof for removing rust, scale or the like from the inside wall of the pipeline when such foreign substance is brittle and can be loosened by jarring. For this purpose, the rollers are arranged, as shown, to provide substantially full coverage about the line and to support the body centrally in the line. If desired, additional rollers may be used to provide more complete coverage. The foreign substance so removed may be removed either by cups on the body or by means of another body subsequently passed through the line.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline scraper, comprising a body having means resiliently mounted thereon for scraping the inside wall of a pipeline as it is moved longitudinally therethrough, and a roller carried by and resiliently urged away from the body for rotatably engaging the wall of the pipeline as the body is moved therethrough, said roller having a periphery with first and second wall engaging portions circumferentially and radially offset from each other with the second portion being on a substantially lesser radius than is the first portion, said second portion being spaced behind the first portion in the direction of rotation of said roller and both of said first and second portions being exposed for simultaneous contact with the pipeline wall at one rotative position of the roller so that the second portion is caused to intermittently jar against the wall of the pipeline during rotation of said roller.

2. A pipeline scraper of the character defined in claim 1, including a leaf spring connected at one end to said body and extending rearwardly therefrom, and a bearing on the other end of said leaf spring mounting said roller for rotation about an axis transverse to the pipeline, said leaf spring being separate from the resiliently mounted scraping means so that the roller and scraping means can move independently of each other, a limited distance toward and away from the pipeline wall.

3. A pipeline scraper of the character defined in claim 1, including a spring connected to said body so that the spring has a free end, a bearing mounting said roller for rotation, and means detachably securing the bearing to the spring including a part overhanging said free end of the spring so that the roller can be mounted on the spring for rotation in only one directional sense.

4. A pipeline scraper, comprising a body having means thereon for scraping the inside wall of a pipeline as it is moved longitudinally therethrough, cam means carried by and resiliently urged away from the body for rotatably engaging the wall of the pipeline as the body is moved therethrough, the periphery of said cam means having a single spiral providing adjacent circumferentially and radially offset portions arranged as to cause the portion of lesser radial extent to intermittently jar against the wall of the pipeline as the portion thereof of greatest radial extent rotates toward disengagement from the wall.

5. A pipeline scraper of the character defined in claim 4, wherein said cam means includes a plurality of separate cams fixed to a common shaft with their spiraled peripheries synchronized to jar against the pipeline wall substantially simultaneously.

6. Apparatus for removing foreign substance from the inside wall of a pipeline, comprising a body movable longitudinally through a pipeline, and a plurality of rollers carried by and resiliently urged away from the body for rotatably engaging the wall of the pipeline as the body is moved therethrough, said roller having a periphery with first and second wall engaging portions circumferentially and radially offset from each other with the second portion being on a substantially lesser radius than is the first portion, said second portion being spaced behind the first portion in the direction of rotation of said roller and both of said first and second portions being exposed for simultaneous contact with the pipeline wall at one rotative position of the roller so that the second portion is caused to intermittently jar against the wall of the pipeline during rotation of said rollers, and said rollers being arranged about the body to provide substantially full coverage about the circumference of the wall of the pipeline.

7. A pipeline scraper, comprising a body movable longitudinally through a pipeline, a plurality of scraping elements, first leaf springs connected to the body and respectively carrying the scraping elements for scraping the inside wall of the pipeline as the body is moved therethrough, a plurality of rollers, a plurality of second leaf springs connected to the body and carrying the rollers about the body for rotatably engaging the pipeline wall, each of said rollers being arranged forwardly of and in substantial longitudinal alignment with a scraping element, and the leaf spring mounting each scraping element being arranged relative to the leaf spring mounting the roller forwardly thereof so as to depress said element in response to predetermined depression of said roller.

References Cited in the file of this patent

UNITED STATES PATENTS

| 332,910 | Klein | Dec. 22, 1885 |
| 594,221 | Weinland | Nov. 23, 1897 |
| 801,515 | Ehrhardt | Oct. 10, 1905 |
| 971,042 | Hill et al. | Sept. 22, 1910 |

FOREIGN PATENTS

| 341,023 | Germany | Sept. 22, 1921 |
| 449,513 | Germany | Sept. 14, 1927 |